United States Patent [19]

Herchenbach

[11] 4,382,202
[45] May 3, 1983

[54] PIEZOELECTRIC LOADING DEVICE

[75] Inventor: Paul Herchenbach, Ruppichteroth, Fed. Rep. of Germany

[73] Assignee: Jean Walterscheid GmbH, Lohmar, Fed. Rep. of Germany

[21] Appl. No.: 296,073

[22] Filed: Aug. 25, 1981

[30] Foreign Application Priority Data

Sep. 2, 1980 [DE] Fed. Rep. of Germany ....... 3032961

[51] Int. Cl.³ .......................................... H01L 41/00
[52] U.S. Cl. .................................. 310/328; 310/339; 310/355
[58] Field of Search ............... 310/328, 329, 333, 339, 310/355; 192/30 W

[56] References Cited

U.S. PATENT DOCUMENTS

| | | | |
|---|---|---|---|
| 2,686,882 | 8/1954 | Mallinckrodt | 310/333 |
| 3,211,931 | 10/1965 | Tehon | 310/333 |
| 3,590,289 | 6/1971 | Ostwald | 310/329 |
| 4,156,825 | 5/1979 | Kondo et al. | 310/339 |

*Primary Examiner*—William M. Shoop
*Assistant Examiner*—Peter S. Wong
*Attorney, Agent, or Firm*—Toren, McGeady and Stanger

[57] ABSTRACT

An actuating device for loading a piezoelectric element including a loading element and a control element each fixed, respectively, upon one of a pair of relatively rotatable parts which may form part of a clutch. Cam projections on the control element intermittently lift the loading element away from the piezoelectric element whenever relative rotation of the two rotatable parts occurs in either direction. Sudden release of the loading element after being raised by the cam projections provides loading on the piezoelectric element to produce an electrical discharge thereby, for example, to indicate the occurrence of clutch slippage.

7 Claims, 4 Drawing Figures

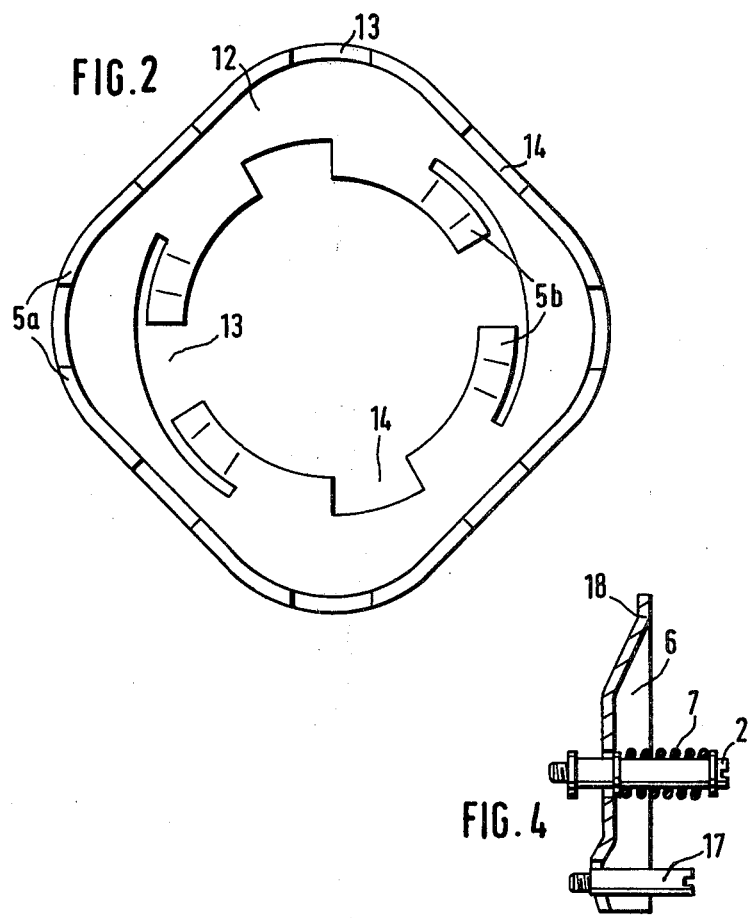
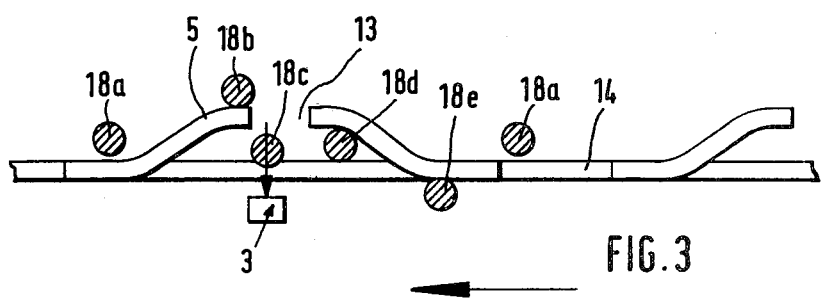

PIEZOELECTRIC LOADING DEVICE

This invention relates generally to devices utilizing a piezoelectric element and more particularly to apparatus for loading a piezoelectric element to develop an electrical signal.

An example of a device for loading a piezoelectric element is disclosed in German Offenlegungsschrift No. 28 04 048. The piezoelectric element disclosed in this prior art publication is loaded by a first cam fixed to a lever arm which is guided at its other end for arcuate movement. The control knob of a gas burner is rotated in a counterclockwise direction causing the guided part of the lever arm to progressively engage a further cam on the control knob as the knob is turned. The control lever arm eventually reaches a zenith of the further cam as the control knob is rotated and then swings back sharply to its original position causing a sudden change in the loading of the piezoelectric element which produces an electric discharge to ignite the gas. When the control knob is returned to its original position by rotation in a clockwise direction, the control lever remains stationary and does not cam out.

However, a device such as this is found unsuitable for use in applications where it is necessary to provide a loading device for a piezoelectric element in which rotation of one component with respect to another component may occur in opposite directions, both clockwise and counterclockwise.

A device which produces an electrical discharge of the piezoelectric element in either direction of rotation may find application for example in an overload clutch in a drive shaft where it may be desirable to determine if clutch slippage is occurring between the engaged clutch plates and wherein the electrical signal produced by the piezoelectric element provides an easily detectable indication of such slippage.

Accordingly, the present invention is directed toward provision of a device for loading a piezoelectric element which permits conversion of the load imposed into electric energy by relative rotation in either direction of one part of an actuating device with that of another part of the actuating device.

SUMMARY OF THE INVENTION

In accordance with the present invention there is provided a device for loading a piezoelectric element to give an electric signal upon relative rotation occurring between two parts comprising a loading element mounted on one of the parts with the piezoelectric element, and a control element mounted on the other of the parts and provided with at least one cam surface for causing the loading element to load the piezoelectric element, wherein the cam surface is effective to load the piezoelectric element upon clockwise or counterclockwise rotation occurring between the parts. The loading element on the actuating device may be operated by a sensing element engageable with the cam surface or other cam surface means provided on the control element and the control element may afford one or more openings enabling the sensing element to return to a disengaged position with respect to the cam surface means.

The control element may be a disc which is fixed to a first of said two relatively rotatable parts, with the disc incorporating evenly spaced projections of a cam profile and evenly spaced openings to allow return of the loading element to a neutral position. The loading element may comprise a spring-loaded hammer which is fixed to a second of said two relatively rotatable parts and arranged relative to the control element such that a sensing element on the loading element can follow the cam profile on the control element as the first rotatable member or part is rotated relative to the second rotatable member or part. The first and second rotatable members may be a clutch hub and a clutch drum, respectively.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE DRAWINGS

In the drawings:

FIG. 2 is a schematic representation of a control element in accordance with the present invention which includes parts representative of two embodiments of the invention;

FIG. 3 shows a developed schematic representation of cam profiles formed in the control element depicted in FIG. 2 and the relative movements of the loading element; and FIG. 4 is a sectional view of the loading element shown in FIG. 1.

DETAILED DESCRIPTION OF THE PREFERRED EMBODIMENTS

Figure 1:
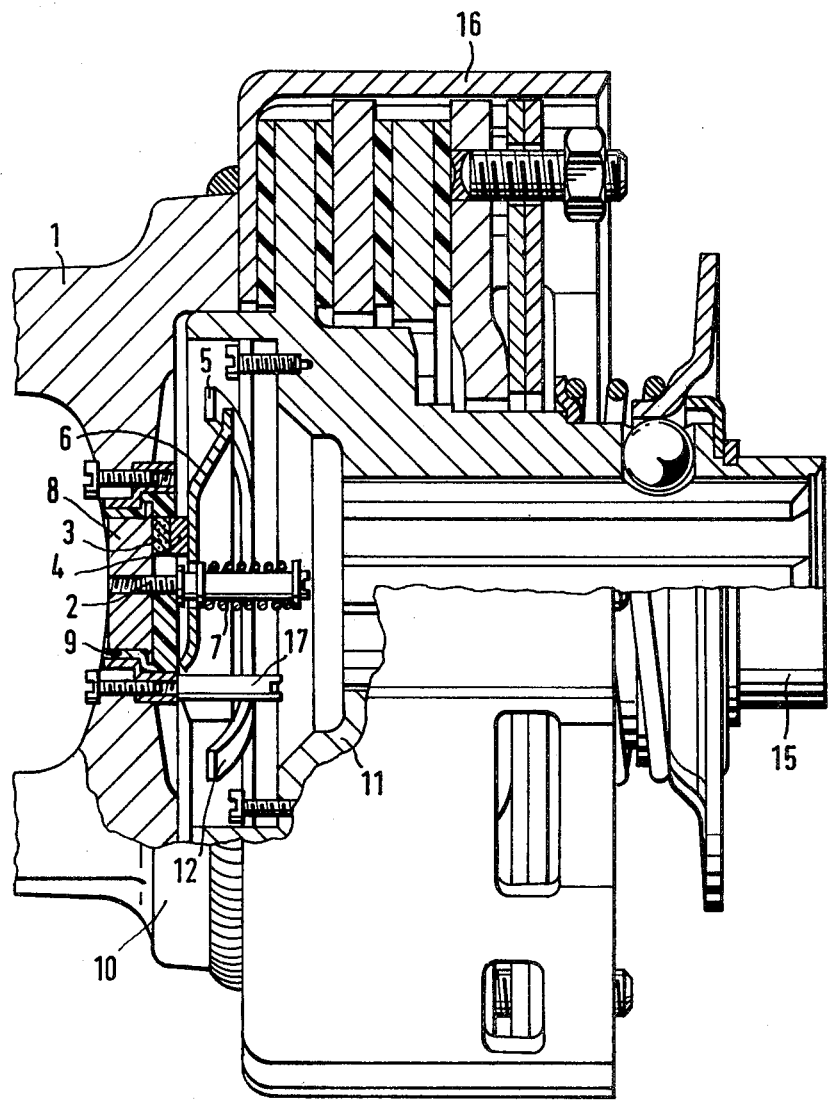
FIG. 1 is a view partially in section showing a clutch assembly incorporating a device in accordance with the present invention.

Referring now to the drawings wherein similar parts are identified with like reference numerals in each of the figures thereof, the present invention is shown as embodied in an overload clutch which includes a clutch hub 11 and a clutch drum 16 between which torque is transmitted by conventional spring-loaded clutch plates. The drum 16 is welded to a part 10 connected to a universal joint fork 1. The clutch hub 11 is internally splined to receive a conventional splined transmission shaft and it has a quick release attachment device 15.

If the overload clutch slips, relative rotation between the clutch part 10 and the clutch hub 11 in either direction of rotation may occur. Thus, the clutch part 10 and the clutch hub 11 may be considered a pair of members rotatable relative to each other either in a clockwise or a counterclockwise direction during the occurrence of clutch slippage.

Accommodated between the clutch part 10 and the clutch hub 11 are a piezoelectric element 3 fixed to the part 10 and an annular control element 12 fixed to the clutch hub 11. A loading element 6 is fixed to the part 10 by means of a bolt 2 upon which is mounted a spring 7 which operates to urge the loading element 6 toward an impact plate 4 located between the loading element 6 and the piezoelectric element 3.

A peg 17 fixed to the part 10 at a position remote from the bolt 2 and engaging in a slot in the loading element 6 prevents independent rotation of the loading element 6 with respect to the part 10.

The piezoelectric element 3 and the bolt 2 are supported for rotation with the part 10 on a supporting plate 8 insulated from the part 10 by an insulating bush 9.

The control element 12 is fixed to the clutch hub 11 by means of circumferentially spaced screws. At spaced intervals around the control element 12 there are provided axially projecting portions 5 of a cam profile which, as shown in FIG. 3, comprise the cam surface means of the invention. A sensing element 18 shown in FIG. 4 projects from the loading device 6 and is engageable with the cam surfaces 5 of the control element 12.

Shown in FIG. 2 is a diagrammatic representation of two possible configurations of the control element 12 and, for purposes of illustration, one alternative is shown superposed upon the other. The control element corresponding to the control element 12 shown in FIG. 1 has cam projections 5b radially spaced around the axis of rotation of the clutch hub 11. In this arrangement, the cam profile describes a path which varies axially relative to the rotation of the clutch assembly. However, in the alternative configuration shown at 5a in FIG. 2, when an actuating device of shortened axial length is required, the cam profile may be formed to describe a path which varies radially with respect to the axis of rotation of the clutch. In principle, the cam profile 5A corresponds to the cam profile 5b.

FIG. 3 shows a developed view of the cam profiles 5a or 5b and further includes a pictorial representation of the movement of the sensing element 18 as the control element 12 is rotated relative to the loading element 6.

With reference to FIG. 3, in the position shown at 18a, the loading element 6 is in a neutral position on the side of the control element 12 away from the piezoelectric element 3. The spring 7 is in its substantially uncompressed state.

In the position shown at 18b, the sensing element has moved to describe a path determined by the shape of the cam profile 5 and the loading element 6 has therefore been separated from the impact plate 4 by a proportionate distance relative to the height of the cam profile. The spring 7 has become compressed.

At the position shown at 18c, the control element 12 has been rotated further until the sensing element 18 has lost contact with the cam profile 5 and returned to its original position through an opening 13. The load imposed upon return of the sensing element and loading element 6 is received by the impact plate 4 which compresses the crystals in the piezoelectric element 3 in order to produce an electrical discharge. The electrical discharge so produced may be transmitted so as to be converted into a visual or audio signal in any conventional manner.

The position shown at 18d is one wherein the control element 12 has been rotated further until the underside of the cam profile 5 abuts the sensing element 18 at position 18d. Upon further rotation to the position shown at 18e, the sensing element 18 has travelled under the cam profile 5 and has forced the loading element 6 to pivot around the bolt 2. When the sensing element 18 reaches an opening 14 provided in the control element 12, the sensing element will return to its original position.

Because of the arrangement of the cam portions or surfaces 5, the sequence described above may occur with relative rotation between the control element 12 and the loading element 6 in either one of two opposed directions.

The frequency of the piezoelectrical discharge may be increased by introducing a greater number of cam projections 5 at spaced intervals around the control element 12.

While specific embodiments of the invention have been shown and described in detail to illustrate the application of the inventive principles, it will be understood that the invention may be embodied otherwise without departing from such principles.

What is claimed is:

1. A device for loading a piezoelectric element to give an electrical signal upon relative rotation occurring between two members comprising: a loading element mounted with said piezoelectric element on one of said members; and a control element mounted on the other of said members, said control element including cam surface means engaging said loading element to cause said loading element to load said piezoelectric element; said cam surface means being effective to load said piezoelectric element upon relative rotation between said two members in both a clockwise direction and a counterclockwise direction.

2. A device according to claim 1 wherein said loading element is operated by a sensing element which is engageable with said cam surface means.

3. A device according to claim 2 wherein said control element is formed to define at least one opening enabling said sensing element to return to a position disengaged with respect to said cam surface means.

4. A device according to claim 1 wherein said loading element is spring-loaded.

5. A device according to claim 1 wherein said cam surface means are shaped to define a cam profile which describes a path which varies axially relative to the axis of rotation of said control element.

6. A device according to claim 1 wherein said cam surface means is shaped to define a cam profile which describes a path which varies radially with respect to the axis of rotation of said control element.

7. A device according to claim 1 wherein said device is incorporated in a clutch mechanism and wherein said two relatively rotatable members comprise, respectively, a clutch hub and a clutch drum of said clutch mechanism.

* * * * *